(12) United States Patent
Spears et al.

(10) Patent No.: US 8,504,444 B2
(45) Date of Patent: Aug. 6, 2013

(54) METHOD AND SYSTEM FOR INCREASING ADVANCE ORDERS

(76) Inventors: David Wayne Spears, Torrance, CA (US); Jitahadi Smith, Los Angeles, CA (US)

( * ) Notice: Subject to any disclaimer, the term of this patent is extended or adjusted under 35 U.S.C. 154(b) by 157 days.

(21) Appl. No.: 12/960,761

(22) Filed: Dec. 6, 2010

(65) Prior Publication Data

US 2011/0077987 A1 Mar. 31, 2011

Related U.S. Application Data

(63) Continuation of application No. 10/759,884, filed on Jan. 15, 2004, now Pat. No. 7,848,952.

(51) Int. Cl.
*G06Q 10/00* (2012.01)

(52) U.S. Cl.
USPC ............. 705/28; 705/7.31; 705/22; 705/14.1; 719/313; 717/101; 709/221

(58) Field of Classification Search
USPC ........ 705/7.31, 22, 28, 14.1, 10, 26; 719/313; 717/101
See application file for complete search history.

(56) References Cited

U.S. PATENT DOCUMENTS

| | | | |
|---|---|---|---|
| 5,064,999 A | 11/1991 | Okamoto et al. | |
| 5,717,989 A | 2/1998 | Tozzoli et al. | |
| 6,014,634 A | 1/2000 | Scroggie et al. | |
| 6,321,984 B1 | 11/2001 | McCall et al. | |
| 6,553,347 B1 | 4/2003 | Tavor et al. | |
| 6,615,184 B1 | 9/2003 | Hicks | |
| 6,754,636 B1 | 6/2004 | Walker et al. | |
| 6,792,411 B1 | 9/2004 | Massey, Jr. | |
| 7,024,376 B1 | 4/2006 | Yuen | |
| 7,181,419 B1 | 2/2007 | Mesaros | |
| 7,343,319 B1 | 3/2008 | Walker et al. | |
| 7,496,543 B1 | 2/2009 | Bamford et al. | |
| 7,499,871 B1 | 3/2009 | McBrayer et al. | |
| 7,555,444 B1 | 6/2009 | Wilson et al. | |
| 7,720,770 B1 | 5/2010 | Morimoto | |
| 7,848,940 B1 | 12/2010 | Harniman et al. | |
| 8,135,505 B2 | 3/2012 | Vengroff et al. | |
| 8,150,439 B2 | 4/2012 | Vengroff et al. | |
| 8,150,735 B2 | 4/2012 | Walker et al. | |
| 2005/0055303 A1 | 3/2005 | Routtenberg | |
| 2008/0052185 A1 | 2/2008 | Goel | |
| 2008/0097827 A1 | 4/2008 | Leach et al. | |
| 2010/0287103 A1 | 11/2010 | Mason | |

OTHER PUBLICATIONS

Kauffman, Robert J.; Wang, Bin—Bid Together, Buy Together: on the Efficacy of Group-buying Business Models in Internet-based Selling. Paper prepared for "The (R)evolution Goes Mobile," 5th Annual University of Minnesota Electronic Commerce Conference, Mar. 27-28, 2001, Carlson Scool of Management, University of Minnesota, Minneapolis, MN (Last revised: May 16, 2001), pp. 1-44.

*Primary Examiner* — Vanel Frenel
(74) *Attorney, Agent, or Firm* — Scott R. Hansen; Fulwider Patton LLP

(57) ABSTRACT

A system and method are described for increasing advance orders for goods or services. In one embodiment, the method comprises receiving advance orders for a product with a specified release date from a plurality of buyers and moving up the release date if a goal is met, wherein the goal based at least in part on the number of advance orders received.

25 Claims, 3 Drawing Sheets

METHOD AND SYSTEM FOR INCREASING ADVANCE ORDERS

CROSS-REFERENCES TO RELATED APPLICATIONS

This application is a continuation of U.S. application Ser. No. 10/759,884, filed Jan. 15, 2004 incorporated by reference in its entirety.

BACKGROUND

Achieving adequate return on investment in the music, movie, gaming, publication and other content-based industries has been a longstanding problem, in part because of the difficulty of accurately forecasting sales. As these industries move towards providing their products in digital form, digital piracy and Internet file sharing will only make this problem worse.

One way to reduce this problem is via advance orders. Increasing the number of advance orders provides certain revenue, improves overall sales forecasts, and reduces digital piracy. Another way is to obtain as many indications of buyer interest in a product as possible prior to its release, which make sales forecasts more accurate.

One way to reduce this problem is via advance orders. Increasing the number of advance orders provides certain revenue, improves overall sales forecasts, and reduces digital piracy. Another way is to obtain as many indications of buyer interest in a product as possible prior to its release, which make sales forecasts more accurate.

However, these traditional methods are inefficient because a large, motivated, but untapped "sales force" is wasted, namely the very buyers that submit advance orders. These buyers typically want the product as soon as possible, but traditional methods do not strongly encourage these buyers to advance order multiple copies or get other buyers to submit advance orders as well.

Another method is the "preorder (or P#) plan" offered by Multiman Publishing at www.mulitmanpublishing.com. Under this plan, Multiman will not produce one of its war game products until after it has received enough preorders to cover the printing costs of the product. Multiman has a preorder web page that lists, for each potential product, how many preorders have been received as well as the number of preorders that are required for that product to get printed. If the product receives the necessary number of preorders, Multiman sends it off to the printer and starts the production cycle. If the product does not receive enough preorders, it is not printed or sold. (For more information, see http://www.mulitmanpublishing.com/preorder/whyPreorder.php.)

The Multiman preorder plan suffers from several deficiencies and shortcomings. It creates uncertainties for the buyers because the buyers do not know when they will receive the product. No release date is specified until after the product has received the necessary number of preorders. In some cases, buyers who preorder may never receive the product, yet these buyers are typically the people who want the product as soon as possible.

Thus, there is a continuing need for new methods and systems for increasing advance orders, which preferably will complement traditional methods and systems.

SUMMARY OF THE INVENTION

The present invention overcomes the limitations and disadvantages of the prior art by providing a new method and system for increasing advance orders. The method and system use a dynamic release date as an incentive for buyers to advance order multiple copies and get other buyers to submit advance orders as well.

One aspect of the invention involves a method in which a seller receives advance orders for a product with a specified release date from a plurality of buyers and moves up the release date for the product if a goal is met, wherein the goal is based at least in part on the number of advance orders received.

In one embodiment, a seller sets a first release date for a product and a goal based at least in part on the number of advance orders for the product. The seller receives advance orders for the product from a plurality of buyers, and changes the first release date to a second, earlier release date if the goal is met.

In another embodiment, a seller sets a first release date for a product and a goal based at least in part on the number of indications of buyer interest for the product. The seller receives indications of buyer interest for the product from a plurality of buyers, and changes the first release date to a second, earlier release date if the goal is met.

In another embodiment, a buyer receives information about a product that includes a first release date for the product. The buyer sends an advance order for the product and the first release date is changed to a second, earlier release date if a goal is met. The goal is based at least in part on the number of advance order for the product.

Another aspect of the invention involves a system that increases advance orders.

Another aspect of the invention involves a machine readable medium with stored data thereon that represent sequences of instructions for increasing advance orders.

The benefits of the invention accrue to all participants. Sellers get more orders upfront, better forecasts, and less piracy. Buyers get the products they want sooner.

The foregoing and other embodiments and aspects of the present invention will become apparent to those skilled in the art in view of the subsequent detailed description of the invention taken together with the appended claims and the accompanying figures.

DETAILED DESCRIPTION OF THE PREFERRED EMBODIMENTS

Figure 1:
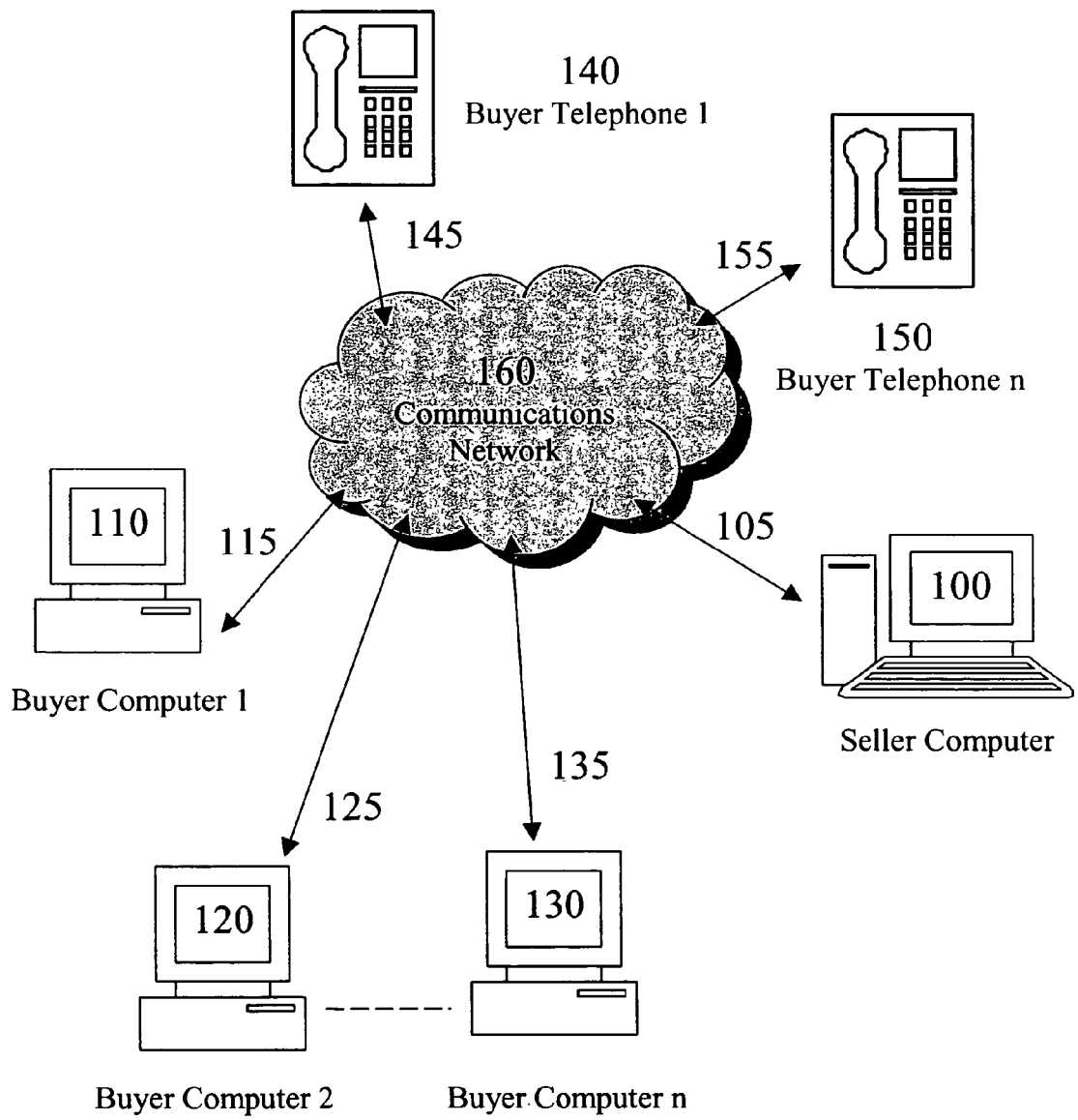
FIG. 1 is a schematic diagram illustrating an exemplary communications system.

A method and system are described for increasing advance orders. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Different sources often give business and technical terms somewhat different meanings or scope. THUS, IN THE SPECIFICATION AND CLAIMS, THE DEFINITIONS SET FORTH BELOW SHALL BE CONTROLLING.

advance order—A binding commitment to purchase a good or service made prior to the release date of the good or service. An advance order may also include the provision of an upfront payment, deposit, or credit card number to be charged.

buyer—Any entity that purchases goods and/or services from a seller or that is interested in purchasing goods and/or services from a seller.

computer—Any device that processes information using an integrated circuit chip, including without limitation mainframe computers, server computers, desktop computers, portable computers, embedded computers, and hand-held computers. As used herein, a "seller computer" is a computer or a combination of computers (i.e., a computer system) that is used by a seller to send information about a product to a plurality of buyers and receive advance orders (or indications of buyer interest) for the product from a plurality of buyers. However, the "seller computer" is not the entire network of computers that connects this computer to computers that may be used by buyers to send in their advance orders. For example, the "seller computer" could be a single computer that communicates with buyer computers via the Internet. The "seller computer" includes a machine readable medium with stored data thereon that represent sequences of instructions for increasing advance orders. Similarly, a "buyer computer" is a computer or a computer system that is used by a buyer to receive information about a product and send advance orders (or indications of buyer interest) for the product to the seller computer. However, the "buyer computer" is not the entire network of computers that connects this computer to the seller computer. For example, the "buyer computer" will typically be a single computer (e.g., a desktop computer, portable computer, or hand held computer) that communicates with the seller computer via the Internet.

entity—Any person, institution, company, corporation, partnership, government agency, or university.

goal—An aim, target, or end toward which effort is directed. goal feedback information—Information about progress toward achieving a goal.

indication of buyer interest—A sign of a buyer's desire to purchase a good or service.

participant—A buyer or a seller.

product—Any good or service, including, without limitation, both tangible and digital forms.

release—To make a product available for use.

release date—The date on which a product becomes available for use, either to all paying buyers or to some subset thereof (e.g., buyers that have submitted advance orders).

seller—Any entity that sells products to buyers.

FIG. 1 illustrates an exemplary communications system. This system includes: seller computer 100, buyer computers 110, 120, and 130, buyer communications devices (e.g., telephones) 140 and 150, and communications network 160 with communication links 105, 115, 125, 135, 145, and 155. Communications network 160 can be virtually any type of communications network, such as the Internet or the public switched telephone network (PSTN), and need not be described in detail because such networks are well known to those of ordinary skill in the art.

Figure 2:
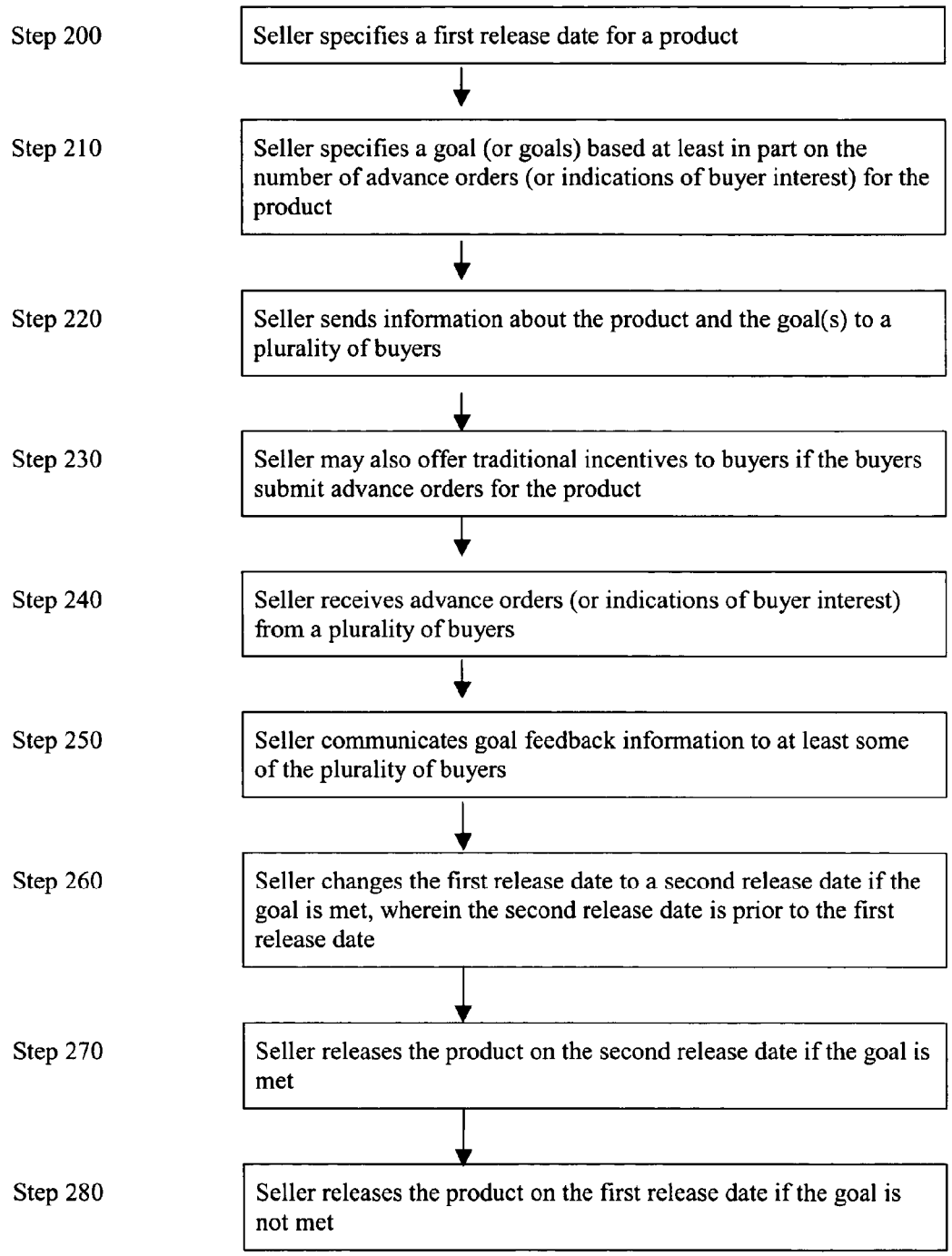
FIG. 2 is a flow chart of an exemplary process for increasing advance orders.
Figure 3:
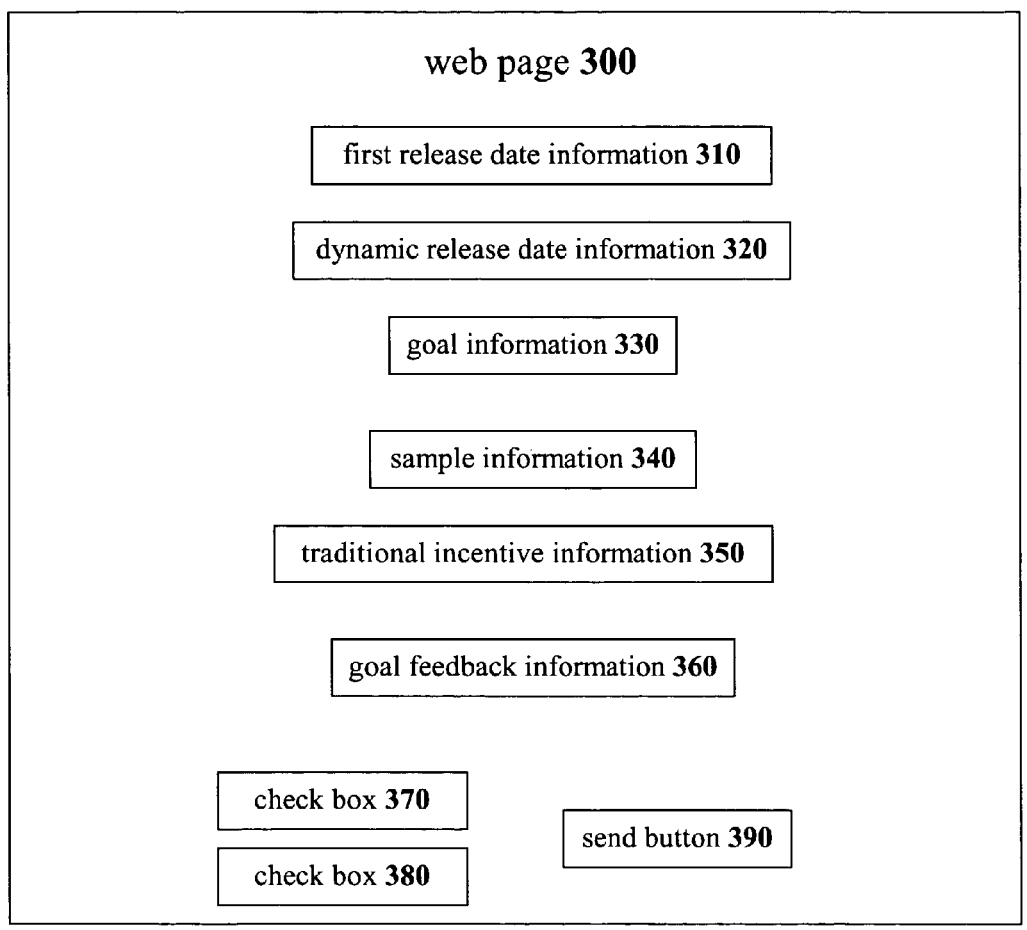
FIG. 3 is an exemplary web page containing information about a product.

FIG. 2 is a flow chart of an exemplary process for increasing advance orders.

At step 200, a seller specifies a first release date for a product. In a computer-implemented embodiment, this step may include storing the first release date in seller computer 100. For example, the seller could set December 1 in the current year as the release date for the product and store this date in seller computer 100.

At step 210, the seller specifies a goal (or goals) based at least in part on the number of advance orders (or indications of buyer interest) for the product. In a computer-implemented embodiment, this step may include storing the goal in seller computer 100. For example, the seller could set a goal of one million advance orders for the product and store this goal in seller computer 100.

In one embodiment, the seller can specify multiple goals, with at least some of the goals based at least in part on the number of advance orders and with corresponding changes in the release date when each goal is met. In a computer-implemented embodiment, this step may include storing the goals in seller computer 100. For example, the seller could set goals of one million advance orders of the product, two million advance orders, and three million advance orders and store these goals in seller computer 100.

In another embodiment, the seller specifies a goal based at least in part on the number of indications of buyer interest for the product. In a computer-implemented embodiment, this step may include storing the goal in seller computer 100. For example, the seller could set a goal of one million indications of buyer interest for the product and store this goal in seller computer 100.

In another embodiment, the seller can specify multiple goals, with at least some of the goals based at least in part on the number of indications of buyer interest for the product and with corresponding changes in the release date when each goal is met. In a computer-implemented embodiment, this step may include storing the goals in seller computer 100. For example, the seller could set goals of one million indications of buyer interest for the product, two million indications, and three million indications and store these goals in seller computer 100.

At step 220, the seller sends information about the product and the goal(s) to a plurality of buyers. The information about the product may include, without limitation, a description of the product, its price, and its release dates. The information may also include a sample of the product, such as an audio, video, multimedia, text, or picture excerpt from the product. As explained below, more than one release date is typically specified, with the actual release date depending on what goal or goals have been met. In turn, the goal or goals depend at least in part on the number of advance orders (or indications of buyer interest) for the product.

The goal would typically include the number of advance orders (or indications of buyer interest) required to change the first release date to a second, earlier release date. For example, if the goal of one million advance orders for the product was met, the release date would be moved forward from December 1 of the current year to September 1 of the present year.

In one embodiment, there may be multiple goals that specify: the number of advance orders (or indications of buyer interest) required to change the first release date to a second, earlier release date; the number of advance orders (or indications of buyer interest) required to change the second release date to a third, still earlier release date; and so on. For example, if the goal of one million advance orders for the product was met, the release date would be moved forward from December 1 of the current year to September 1 of the current year; if the goal of two million advance orders for the product was met, the release date would be moved forward to August 1 of the current year; and if the goal of three million advance orders for the product was met, the release date would be moved forward to July 1 of the current year.

In a computer-implemented embodiment, step 220 would typically occur by having seller computer 100 send the information about the product and the goal(s) via communications network 160 with communication links 105, 115, 125, and 135 to a plurality of buyer computers (such as buyer computers 110, 120, and 130), which receive the information and display the information to a plurality of buyers. For example, seller computer 100 could be a web server that sends web page 300 with the product information via the Internet to a plurality of buyer computers, which receive and display the web page using a web browser.

In one embodiment, step 220 can occur by having seller computer 100 send the information about the product and the goal(s) via communications network 160 and communication links 105, 145, and 155 to a plurality of buyer's communication devices (such as buyer telephones 140 and 150), which receive the information and communicate the information to a plurality of buyers.

At step 230, the seller may also offer traditional incentives to the buyers if the buyers submit advance orders for the product. Traditional incentives include, without limitation, one or more of: a discounted price, freebies, demos, samples, special limited edition collector's versions of the product, artist autographs, concert tickets, back-stage passes, limousine transportation, private industry party invitations, artist interaction, and other similar enticements.

At step 230, the seller may also offer traditional incentives to the buyers if the buyers submit advance orders for the product. Traditional incentives include, without limitation, one or more of: a discounted price, freebies, demos, samples, special limited edition collector's versions of the product, artist autographs, concert tickets, back-stage passes, limousine transportation, private industry party invitations, artist interaction, and other similar enticements.

In one embodiment, step 240 can occur by having the seller's sales representatives or seller computer 100 receive advance orders (or indications of buyer interest) via communications network 160 and communication links 105, 145, and 155 from a plurality of buyer's communication devices, such as buyer telephones 140 and 150 or buyer fax machines.

At step 250, the seller communicates goal feedback information, such as the number of advance orders (or indications of buyer interest) received, to at least some of the plurality of buyers. For example, the seller could communicate to at least some of the buyers that 900,000 advance orders for the product have been received. Alternatively, the seller could communicate that 90% of the advance orders needed to reach the goal of one million orders have been received, or that there must be an additional 100,000 orders to reach the goal that will trigger the change in the release date from December 1 to September 1. All three of these exemplary communications provide feedback to buyers that tells them how close the goal is to being achieved. This feedback encourages buyers to make more advance orders and to get others to do so as well.

In a computer-implemented embodiment, step 250 would typically occur by having seller computer 100 send goal feedback information via communications network 160 with communication links 105, 115, 125, and 135 to a plurality of buyer computers (such as buyer computers 110, 120, and 130), which receive the information and display the information to a plurality of buyers. For example, seller computer 100 could be a web server that sends a web page with goal feedback information via the Internet to a plurality of buyer computers, which receive and display the web page using a web browser. This web page could be the same as (or an update of) web page 300.

At step 260, the seller changes the first release date to a second release date if the goal is met, wherein the second release date is prior to the first release date. For example, if the seller receives one million advance orders for the product, then the release date is moved up from December 1 to September 1 of the current year. In one embodiment, the release date is changed to the second, earlier date for all buyers. In another embodiment, the release date is changed to the second, earlier date only for those buyers that submitted advance orders (or indicators of buyer interest).

In a computer-implemented embodiment, this step may include seller computer 100 using the second release date (rather than the first release date) as the actual release date when the goal is met. For example, seller computer 100 could use September 1 of the current year (rather than December 1 of the current year) as the actual release date when there were one million or more advance orders.

In embodiments with multiple goals, the attainment of a goal would trigger a corresponding change to an earlier release date. For example, the release date would be moved forward from December 1 of the current year to September 1 of the current year when there were one million advance orders for the product; the release date would be moved forward to August 1 of the current year when there were two million advance orders for the product; and the release date would be moved forward to July 1 of the current year when there were three million advance orders for the product.

At step 270, the seller releases the product on the second release date if the goal is met. For example, the seller releases the product on September 1 of the current year if there are one million or more advance orders. In a computer-implemented embodiment, if the product can be made available for use via a communications network, this step may include seller computer 100 distributing the product via network 160 with communications links 105, 115, 125, and 135 to a plurality of buyer computers (such as buyer computers 110, 120, and 130), which download, access, or otherwise use the product on (or after) the second, earlier release date.

At step 280, the seller releases the product on the first release date if the goal is not met. For example, the seller releases the product on December 1 of the current year if there are less than one million advance orders. In a computer-implemented embodiment, if the product can be made available for use via a communications network, this step may include seller computer 100 distributing the product via network 160 with communications links 105, 115, 125, and 135 to a plurality of buyer computers (such as buyer computers 110, 120, and 130), which download, access, or otherwise use the product on (or after) the first release date.

To further describe the use of the present invention, five different exemplary scenarios will be described: (1) the digital product scenario, (2) the tangible good scenario, (3) the mixed product scenario, (4) the digital presentation scenario, and (5) the live presentation scenario.

In the digital product scenario, the invention is used to increase advance orders for a product that can be made available for use via a communications network. Such products include, without limitation, a digitized music recording, movie, or publication that can be streamed and/or downloaded to a buyer computer. In this scenario, the seller will typically promote and distribute the digital product via the seller's web site, which is run by seller computer 100.

For example, seller computer 100 can send web page 300, which contains information about a new, unreleased music recording, via communications network 160 to buyer computers that send a request for web page 300. On web page 300, first release date information 310 states that the new recording will be available for download on April 30th of the present year. Dynamic release date information 320 and goal information 330 state that the new recording will be released on March 15th to those people that advance order the recording if at least 10,000 advance orders are received by March 15th of the present year. Sample information 340 provides a link that lets potential buyers hear a short excerpt from the new recording. Traditional incentive information 350 offers a 10% discount to buyers that submit an advance order. Goal feedback information 360 includes a counter or graphic that shows the amount of progress towards the goal (e.g., the number of advance orders already received). During the time leading up to March 15th, seller computer 100 updates goal feedback information 360 on web page 300 as more advance orders are received. Most of the advance orders come via the Internet, but some may also come by other communications channels, such as phone calls to sales representatives or interactive voice response units or via fax.

In this example, the goal of 10,000 advance orders is reached on February 23rd of the current year. Thus, the new music recording is made available for download on March 15th only to the buyers that submitted advance orders prior to March 15th. Other buyers can order and download the new recording on April 30th of the present year.

In the tangible good scenario, the invention is used to increase advance orders for a good that cannot be made available for use via a communications network (but which can still be marketed and sold via a communications network). Such goods include, without limitation, a hard copy of a music recording (e.g., a CD, tape, or DVD), movie (e.g., a DVD), or publication (e.g., a paperback or hardback book). In this scenario, the marketing and selling of the tangible good will typically include the use of the seller's web site, which is run by seller computer 100.

For example, seller computer 100 can send web page 300, which contains information about a new, unreleased hardback book, via communications network 160 to buyer computers that send a request for web page 300. On web page 300, first release date information 310 states that the new hardback book will be available for purchase from retail stores on December 1st of the present year. Sample information 340 provides a link that lets buyers download a short excerpt from the new book. Traditional incentive information 350 offers a 20% discount to buyers that submit an advance order. Dynamic release date information 320 and goal information 330 state that: (1) the new hardback book will be released to the general public on November 1st of the current year if more than 200,000 buyers download the short excerpt by July 1st of the current year; (2) the book will be released on October 1st exclusively to those people that advance order the book if at least 100,000 advance orders are received by August 1st of the present year; and (3) the book will be released to the general public on November 15th if at least 65,000 advance orders are received by September 1st of the present year. Goal feedback information 360 includes a counter or graphic that shows the amount of progress towards the goals (e.g., the number of downloads of the short excerpt and the number of advance orders). During the time leading up to each goal date, seller computer 100 updates goal feedback information 360 on web page 300. Most of the advance orders come via the Internet, but some may also come by other communications channels, such as phone calls to sales representatives or interactive voice response units or via fax.

In this example, there are only 163,000 downloads of the sample excerpt on July 1st, so the first goal is not met. However, the seller receives the $100,000^{th}$ advance order on July 23rd, so the second and third goals are met. Thus, the new book is shipped on October 1st to the buyers that submitted advance orders and is released to the general public on November 15th.

In the mixed product scenario, the invention is used to increase advance orders for a product that can be sold as both a digital product and a tangible good. Such products include, without limitation, a digitized music recording, movie, or publication that can be streamed and/or downloaded to a buyer's computer, but which is also available in hard copy form (e.g., a CD, tape, DVD, memory card, or paperback book). In this scenario, the seller will typically promote the mixed product and distribute the digital version of the mixed product via the seller's web site, which is run by seller computer 100.

For example, seller computer 100 can send web page 300, which contains information about a new, unreleased movie, via communications network 160 to buyer computers that send a request for web page 300. On web page 300, first release date information 310 states that the new movie will be available for download or for purchase at stores as a DVD on May 1st of the present year. Dynamic release date information 320 and goal information 330 state that the new movie will be released on April 15th if at least 100,000 indications of buyer interest are received by March 1st of the present year. In this example, buyers are asked to indicate whether they are interested in downloading the movie or whether they are interested in purchasing a DVD instead by pressing either check box 370 (e.g., "prefer download") or check box 380 (e.g., "prefer DVD") and then pressing send button 390 on web page 300. Sample information 340 provides a link that lets potential buyers view a trailer from the new movie. Traditional incentive information 350 offers a 10% discount and a movie poster to buyers that submit an advance order. Goal feedback information 360 includes a counter or graphic that shows the amount of progress towards the goal (e.g., the number of indications of buyer interest received). During the time leading up to the March 1st goal date, seller computer 100 updates goal feedback information 360 on web page 300 as more indications of buyer interest are received. The number of advance orders received could optionally be added to the number of "prefer download" and "prefer DVD" checks in determining whether the goal of 100,000 indications of buyer interest was met.

In this example, the goal of 100,000 indications of buyer interest is reached on February 28th of the current year. Thus, the new movie is made available for download and purchase as a DVD on April 15th to the general public. The seller uses the "prefer DVD" indications of buyer interest to help forecast the number of DVDs that need to be produced. For clarity, note that the goal(s) for mixed products could also be based on the number of advance orders, rather than (or in addition to) the number of indications of buyers interest.

In the digital presentation scenario, the invention is used to increase advance orders for a presentation that can be made available via a communications network. Such presentations include, without limitation, live concerts, plays, interviews, lectures, tutorials, and roundtable discussions that can be digitized and sent via the Internet to a buyer computer. In this scenario, the seller will typically promote and distribute the digital presentation via the seller's web site, which is run by seller computer 100.

For example, seller computer 100 can send web page 300, which contains information about an Internet broadcast concert, via communications network 160 to buyer computers that send a request for web page 300. On web page 300, first release date information 310 states that the concert will be shown live on August 1st of the current year. Dynamic release date information 320 and goal information 330 state that the concert will be broadcast live on the Internet to paying buyers on July 4th and a digital recording of the concert will be available for downloading on July 11th if at least 5,000 advance orders are received by June 15th of the current year. Traditional incentive information 350 offers a 15% discount to buyers that submit an advance order. Goal feedback information 360 includes a counter or graphic that shows the amount of progress towards the goal (e.g., the number of advance orders received). During the time leading up to the June 15th goal date, seller computer 100 updates goal feedback information 360 on web page 300 as more advance orders are received. Most of the advance orders come via the Internet, but some may also come by other communications channels, such as phone calls to sales representatives or interactive voice response units or via fax.

In this example, the goal of 5,000 advance orders is reached on June 3rd of the current year. Thus, the concert is broadcast to all paying buyers on July 4th and the digital recording of the concert is made available to everyone for purchasing and downloading on July 11th. Because of the 5,000 advance orders, the concert promoters and producers have enough capital to hold the concert earlier, without waiting for more advertisers, investors, or sponsors.

In the live presentation scenario, the invention is used to increase advance orders for tickets to be part of the audience at a live presentation. Such presentations include, without limitation, concerts, plays, interviews, lectures, tutorials, and roundtable discussions. In this scenario, the marketing and selling of the advance orders for tickets will typically include the use of the seller's web site, which is run by seller computer 100.

For example, seller computer 100 can send web page 300, which contains information about a new play, via communications network 160 to buyer computers that send a request for web page 300. On web page 300, first release date information 310 states that the play will premiere on September 1st of the current year. Dynamic release date information 320 and goal information 330 state that the play will open on June 1st if at least 10,000 advance orders are received by March 1st of the current year. Traditional incentive information 350 offers a 30% discount to buyers that submit an advance order. Goal feedback information 360 includes a counter or graphic that shows the amount of progress towards the goal (e.g., the number of advance orders received). During the time leading up to March 1st, seller computer 100 updates goal feedback information 360 on web page 300 as more advance orders are received. Most of the advance orders come via the Internet, but some may also come via other communications channels, such as phone calls to sales representatives or interactive voice response units or via fax.

In this example, the goal of 10,000 advance orders is reached on February 15th of the current year. Thus, the play opens on June 1st. The 10,000 advance orders generate initial production capital directly from the customers who want to see the play, as opposed to waiting for grants or sponsors to obtain capital. The advance orders would also give the production company a better estimate of how many shows were needed to accommodate the targeted market area.

Although many embodiments of the present invention can be implemented in whole or in part using computers, computers are not required to implement the invention. For example, a seller could place an advertisement in a music magazine stating that a new music CD will be released on November 1st of the current year, but the new CD will be released on October 1st instead if 10,000 advance orders are received. The seller could then receive advance orders for the CD by conventional mail and occasionally place new advertisements that include the number of advance orders received. The seller would then change the release date to October 1st when 10,000 advance orders were received.

The various embodiments described above should be considered as merely illustrative of the present invention. They are not intended to be exhaustive or to limit the invention to the forms disclosed. Those skilled in the art will readily appreciate that still other variations and modifications may be practiced without departing from the general spirit of the invention set forth herein. For example, the live presentation, digital presentation, and mixed product scenarios could be combined to increase advance orders for tickets to a live presentation, Internet broadcasts of the presentation, a downloadable digital recording of the presentation, and a CD or DVD of the presentation. Therefore, it is intended that the present invention be defined by the claims that follow.

We claim:

1. A method of dynamic release date in which the release date of a product, service, event or the like may be set or revised depending on the number of advance orders received, comprising:

creating in a specially programmed computer database a target release date;

transmitting to an interface of a specially programmed computer the target release date and a target number of advance orders;

receiving a number of advance orders from at least one advance purchaser;

transforming the target release date into an actual release date when the number of received advance orders at least equals the target number of advance orders;

wherein the method of dynamic release date further includes offering incentives to submit advance orders.

2. A method as defined in claim 1, wherein the target release date is for the release of at least one of a compact disk and a dvd.

3. A method as defined in claim 1, wherein the target release date is a release date for a movie.

4. A method as defined in claim 1, wherein the method of dynamic release date further includes the step of advancing the target release date to a second, earlier revised release date when the target number of advance orders is received.

5. A method as defined in claim 4, wherein the method of dynamic release date further includes the step of setting a goal and, when both the goal is met and the target number of advance orders is received, advancing the target release date to a third revised release date that is earlier than the second revised release date.

6. A method as defined in claim 1, wherein the method includes providing goal feedback information to at least some of the advance purchasers.

7. A method as defined in claim 1, wherein the method of dynamic release date further includes transmitting to an interface a target release date, a target number of advance orders, and a second release date, wherein the target release date becomes an actual release date if the target number of advance orders is received, and the second release date becomes the actual release date if the target number of advance orders is not received.

8. A method as defined in claim 1, wherein the method of dynamic release date further includes releasing a product to advance purchasers on the actual release date, and releasing the product to other purchasers at a later release date.

9. A method as defined in claim 8, wherein the method of dynamic release date further includes resetting the target release date to a second target release date when the target number of advance orders is not received prior to the target release date.

10. A method as defined in claim 1, wherein the step of offering incentives to submit advance orders comprises offering a discount on a product.

11. A method of dynamic release date in which the release date of a product, service, event or the like may be set or revised depending on the number of advance orders received, comprising:
    creating a specially programmed computer database a target release date;
    transmitting to an interface of a programmed computer the target release date and a target number of advance orders;
    offering incentives to potential purchasers to submit advance orders;
    receiving a number of advance orders from at least one advance purchaser;
    providing goal feedback information to at least one advance purchaser; and
    transforming the target release date into an actual release date when the number of received advance orders received at least equals the target number of advance orders; and
    setting a revised target release date when the number of received advance orders as of a predetermined time is less than the target number of advance orders.

12. A method as defined in claim 11, wherein the method of dynamic release date further comprises advancing the target release date to a second, earlier revised release date when the target number of advance orders is received prior to the target release date.

13. A method as defined in claim 11, wherein the target release date is for the release of at least one of a compact disk, a dvd, a movie, a play, an interview, a lecture, a tutorial, a broadcast and a roundtable discussion.

14. A method as defined in claim 11, wherein the incentive is a discount.

15. A method as defined in claim 11, wherein the method of dynamic release date further comprises receiving advance orders over the internet.

16. A method as defined in claim 11, wherein the advance orders are made for a product that is available in both digital and hard copy form.

17. A method as defined in claim 11, wherein the method of dynamic release date further comprises releasing a product to at least one advance purchaser on the actual release date, and releasing the product to other purchasers at a later release date.

18. A method as defined in claim 17, wherein:
    the advance orders are made for a product that is available in both digital and hard copy form;
    one form of the product is released to advance purchasers on the actual release date, and both forms of the product are released to other purchasers at a later release date.

19. A method as defined in claim 17, wherein:
    the advance orders are made for a product that is available in both digital and hard copy form;
    one form of the product is released to advance purchasers on the actual release date, and a different form of the product is released to other purchasers at a later release date.

20. A method of dynamic release date in which the release date of a product, service, event or the like may be set or revised depending on the number of advance orders received, comprising:
    creating in a specially programmed computer database a target release date;
    transmitting to an interface of a specially programmed computer the target release date;
    receiving a number of advance orders from at least one advance purchaser;
    transforming the target release date into a first actual release date when the number of received advance orders at least equals a target number of advance orders;
    receiving additional advance orders from at least one advance purchaser;
    transforming the target release date from the first actual release date to a second actual release date that is earlier in time than the first actual release date when the number of received advance orders at least equals a second target number of advance orders;
    receiving additional advance orders from at least one advance purchaser; and
    transforming the target release date from the second actual release date to a third actual release date that is earlier in time than the second actual release date when the number of received advance orders at least equals a third target number of advance orders.

21. A method of dynamic release date in which the release date of a product may be set or revised depending on the number of advance orders received, comprising:
    creating in a specially programmed computer database a target release date and a target number of advance orders;
    transmitting from a specially programmed computer the target release date and the target number of advance orders over a computer network to a plurality of potential purchasers;
    offering an incentive to potential purchasers to submit advance orders for the product, wherein the incentive is a discount;
    receiving a number of advance orders for the product from a plurality of advance purchasers over a computer network;
    providing goal feedback information to at least some of the potential advance purchasers;
    transforming the target release date into an actual release date when the number of received advance orders for the product at least equals the target number of advance orders.

22. A method as defined in claim 21, wherein the method of dynamic release date further comprises advancing the target release date to a second, earlier revised release date when the target number of advance orders is received prior to the target release date.

23. A method as defined in claim 21, wherein the method of dynamic release date further comprises receiving advance orders over the Internet.

24. A method as defined in claim 21, wherein the method of dynamic release date further comprises releasing a product to advance purchasers on the actual release date, and releasing the product to other purchasers at a later release date.

25. A method as defined in claim 21, wherein the step of transforming the target release date into an actual release date comprises releasing a product to advance purchasers when the number of received advance orders at least equals a predetermined target number of advance orders.

\* \* \* \* \*